(No Model.)
L. T. PYOTT.
STREET RAILWAY CAR.
No. 542,776. Patented July 16, 1895.
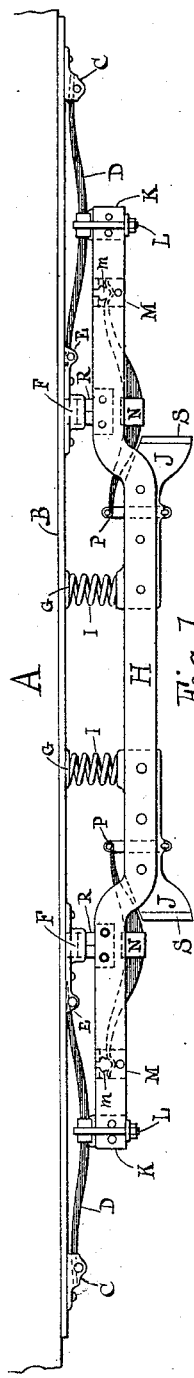
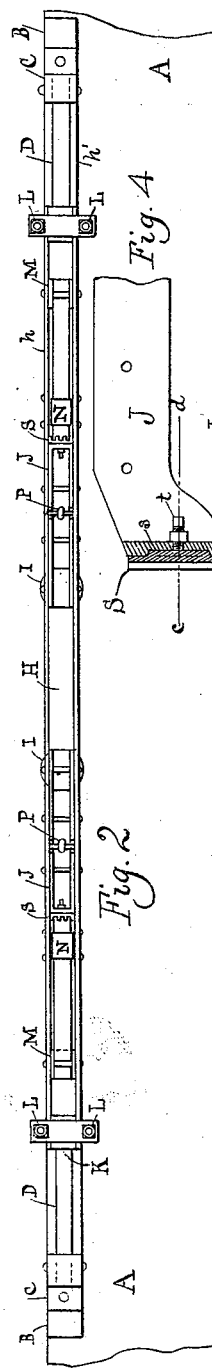
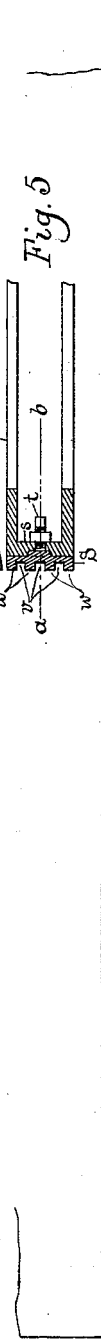
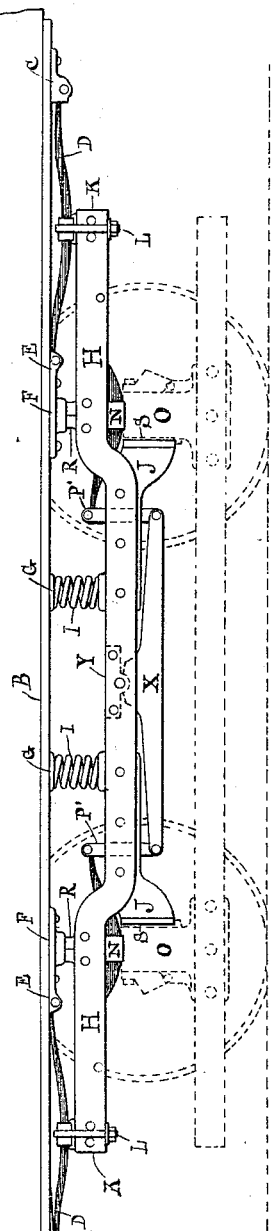
Witnesses: D. A. Waters, J. H. Brearley.
Inventor: Louis T. Pyott
by R. C. Wright, his attorney

UNITED STATES PATENT OFFICE.

LOUIS T. PYOTT, OF PHILADELPHIA, PENNSYLVANIA, ASSIGNOR OF ONE-HALF TO DANIEL A. WATERS AND WILLIAM G. VERNON, OF SAME PLACE.

STREET-RAILWAY CAR.

SPECIFICATION forming part of Letters Patent No. 542,776, dated July 16, 1895.

Application filed March 12, 1895. Serial No. 541,443. (No model.)

*To all whom it may concern:*

Be it known that I, LOUIS T. PYOTT, a citizen of the United States, residing at Philadelphia, in the county of Philadelphia and State of Pennsylvania, have invented certain new and useful Improvements in Street-Railway Cars; and I do declare the following to be a full, clear, and exact description of the invention, such as will enable others skilled in the art to which it appertains to make and use the same, reference being had to the accompanying drawings, and to the letters of reference marked thereon, which form a part of this specification.

My improvements relate to self-propelled street-railway cars, and have for their object the production of cars which shall be so carried as to be easy riding by providing a long spring-base under the car, the car-body being cushioned from shocks incident to imperfect track, rail-joints, or obstructions on the track, the car-body having perfect yet elastic support throughout its length and being capable of quick removal from the truck which carries it, the removal requiring only the simple act of lifting the car-body a comparatively short distance above its normal position, or depressing the truck a short distance below its normal position when it is desired to detach them, and the operation performed without the removal of any bolts, sway-braces, trusses, or other part of the body of the car whatever from its attachment to the car-body, an annoyance and expense usual in cars where the body and truck are interlocked or built together, thus enabling an open or a closed car-body to be quickly removed from its truck and another car-body to be substituted in its place, thus lessening the number of trucks necessary for a road's entire equipment, as the trucks and car-bodies will be thoroughly interchangeable and the cost of equipment very largely reduced for the entire road, as where closed and open cars are generally required for city traffic to suit cold or warm weather the total outlay for trucks will be reduced one-half less than the present system, where the car-body and truck are built together and are practically inseparable, and the number of car-bodies and trucks are of an equal number. A car being incomplete without its own truck built on to it and unattachable, the truck must remain idle, inoperative, and non-earning during the part of the year when the weather is unsuited to its use; also, a car or its truck, as now constructed in an entirety, if one part becomes damaged or wrecked, entails the loss of use of the whole, thus restricting its earning capacity, whereas, with my construction, should a car-body become damaged beyond use until repaired, a spare body can be placed upon the truck to take its place, and vice versa should the truck be damaged, thus very largely adding to convenience in the road's accommodations and earning capacity.

I attain the objects by the mechanism illustrated in the accompanying drawings, in which—

Figure 1 is a side elevation of the substructure under one side of the car; Fig. 2, a view of the under side of Fig. 1. Fig. 3 is a side elevation of the substructure under the side of the car opposite from Fig. 1. Fig. 4 is an enlarged section of the pedestal on line *a b*, Fig. 5. Fig. 5 is an enlarged section of the pedestal on line *c d*, Fig. 4.

Similar letters refer to similar parts throughout the views.

Under the outside sill of the car-body A is secured, flatwise, a metal plate or strap B, which is nearly the length of the car-body, near each end of the plate or strap B, and underneath it is placed a spring-pocket C, in which is inserted one end of a spring D, the end of the spring being free to move as it is contracted or elongated in action. At a point nearer the center of the strap B than the spring-pocket C is another spring-pocket E, into which is inserted the remaining end of the spring, and which is free to move in the pocket when from pressure the spring is elongated or from release of pressure the spring resumes its normal length. The spring-pocket E has constructed in connection with it a guide-pocket F to guide the car-body longitudinally and laterally. Still nearer the center of the strap B are spring-seats G. C, E, F, and G are attached to B and become a part of its structure, the whole being secured under the outside sill of the car-body A on each side of the car, and by this construction the car-body A is continuously supported upon springs on each side at C C, E E, G G.

Below the plate or strap B is a framing H, composed of two similar pieces laid parallel to each other, but some distance apart, and connected by filling-pieces and rivets, as will be more fully described hereinafter. This framing H forms the lower part of the substructure of the car-body, and through the medium of which the car is attached to its truck. The outer ends of the frame H are somewhat nearer the car-body than is its central part, which is curved down to obtain more room for longer spiral springs I and to properly support the pedestals J. At the outer end of the frame H are spring-seats and filling-pieces K, which receive the springs D, to which they are secured by U-bolts L, and also serve to unite the two bars $h\ h'$ of the frame H, to which they are riveted. Nearer the center of the length of the frame H are seats M and rockers $m$, secured between the sides $h\ h'$ of the frame H to receive the outer end of a spring N, which rests upon the axle-box $o$ of the truck. The inner end of the spring is suspended by a link P, secured to the framing H. Over the center of the spring N, and secured to the framing H, is a combined filling-piece and guide R, which is inserted into the guide-pocket F on the bar or plate B and in which it freely moves vertically. At the lower side of the offset of the beam H are attached the pedestals J, one for each truck-axle box, having their face or perpendicular side toward the ends of the framing H. These pedestals extend some distance along the framing H, and seats are provided upon their upper side for the springs I and upon their face or perpendicular side with a shoe S, fitting into a pocket $s$ and having an adjusting-screw $t$ to take up lost motion as the shoes become worn. At the wearing or face side of the shoes S they are constructed with perpendicular tongues $w$ and grooves $v$ or corrugations to increase the amount of wearing-surface and to hold the axle-boxes O sidewise or laterally.

Both sides of my car are not constructed alike, as will be seen by reference to Figs. 1 and 3, each respectively representing one side of the substructure of the car. It will be observed that on one side of the car I have introduced an equalizing-beam X, seated upon a fulcrum Y, secured midway of the length of the framing H and coupled to link P' at each end, the links P' being connected to the ends of the springs N, so that if an undue amount of weight be received by one of the springs N it will be transferred through the spring-links P' and equalizing-beam X to the other spring N, when each will carry the same amount of weight, and each supporting-wheel will have the same amount of traction when the power is applied. It will be evident that as only one side of the car is equalized it practically mounts the car-body on three points, and relieves it of the racking and twisting strains which take effect in cars as now built where the corners of the car are forced in opposite directions, greatly to its damage and speedy destruction. This destructive construction is entirely overcome by my invention of equalizing.

I am aware that prior to my invention locomotives have been equalized laterally to make them more flexible and less liable to leave the rails, and I am also aware that street-cars have been carried on springs from several points on each side in combination with a truck built to the car; but I am unaware of a car having been constructed with a substructure of my construction or for the same purpose and being distinct from and no part of the truck to which it is applied and which operates in conjunction with it. I do not, therefore, broadly claim the multiple-spring support or an equalizing arrangement across the car; but I do claim—

1. In a railway car, the car body, plates under the sills thereof, springs under the plates, frames under the springs and springs in the frames at the point of contact with the truck boxes, the springs being carried at their outer end by a rocker, and at their inner ends by links, secured to the frames, substantially as described.

2. In a railway car, a body part, plates under the sills thereof, and a frame connected therewith, carrying the riding springs and having pedestals, the pedestals extending below the beams and engaging with the truck boxes on one side, substantially as described.

3. In a street car, the car body, the outer sills thereof on plates, the plates on springs and guides connected thereto, an under framing also connected to and supporting the springs and guides, springs in the under framing to rest upon the axle boxes of the independent truck, pedestals to abut the axle boxes, shoes on the pedestals, and tongues and grooves in the shoes to engage the axle boxes of the independent truck on which the car is carried, substantially as described.

4. The combination with a car body of an under framing on each side of the car, and an equalizing beam attached to under frames of one side of the car only, substantially as described.

5. The combination of a car body two under frames, one on each side and two single legged pedestals on each under frame, substantially as described.

6. In a street car the combination of a car body with yielding support, and an under framing on which the yielding support is carried, having its central portion curved down and away from the car body, and single legged pedestals substantially as described.

7. In a street car, the combination of a car body having yielding support, with an under framing under each side having guides on the under framing, and the car body, to maintain the under framing and the car body in their relative positions, and single legged pedestals substantially as described.

8. In a street car, the combination of a car body having yielding mechanism and an under frame for carrying the same, yielding mechanism for carrying the under framing on a separate truck and pedestal legs to form contact with one side of the axle boxes of the independent truck, attached thereto, substantially as described.

9. In a street car, the combination of a car body, under framing on each side, yielding supports connecting the car body to each, the under framings having yielding mechanism for their support on the truck, and an equalizing beam connecting the yielding supports on one side of the car only, substantially as described.

10. In a street car, the combination of a car yieldingly supported, and under framing carrying the yielding supports, pedestals for the under framing, adjustable shoes on the pedestals and corrugations on the shoes, substantially as described.

11. In a street car, the combination of a car body carried on multiple springs, an under framing supporting the springs, pedestals for the under framing adjustable shoes on the pedestals, and vertical tongues and grooves on the shoes, substantially as described.

12. In a street car, the combination of the body of the car with an under framing under each side having springs to support the car body, guides for lateral and longitudinal control of the car body, springs thereto for supporting the frames on its carrying truck, equalizing mechanism on one side of the car to connect the springs bearing on the truck and single legged pedestals, substantially as described.

In testimony whereof I affix my signature in presence of two witnesses.

LOUIS T. PYOTT.

Witnesses:
R. C. WRIGHT,
J. H. BREARLEY.